(12) United States Patent
Ortiz et al.

(10) Patent No.: US 8,365,315 B2
(45) Date of Patent: Feb. 5, 2013

(54) PROTECTIVE ARTICLES FOR RESISTING MECHANICAL LOADS AND RELATED METHODS

(75) Inventors: Christine Ortiz, Melrose, MA (US); Haimin Yao, Quincy, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 66 days.

(21) Appl. No.: 12/958,188

(22) Filed: Dec. 1, 2010

(65) Prior Publication Data

US 2011/0143080 A1    Jun. 16, 2011

Related U.S. Application Data

(60) Provisional application No. 61/265,522, filed on Dec. 1, 2009.

(51) Int. Cl.
*A42B 3/00* (2006.01)
(52) U.S. Cl. .................. 2/411; 2/414; 428/34.1
(58) Field of Classification Search .......... 428/76, 428/74, 80, 34.1; 2/411, 414
See application file for complete search history.

(56) References Cited

U.S. PATENT DOCUMENTS

| | | | | |
|---|---|---|---|---|
| 4,288,268 A | | 9/1981 | Hartung | |
| 4,290,149 A | * | 9/1981 | Aileo | 2/414 |
| 4,307,471 A | * | 12/1981 | Lovell | 2/411 |
| 4,340,631 A | * | 7/1982 | Endo et al. | 428/89 |
| 4,724,549 A | * | 2/1988 | Herder et al. | 2/411 |
| 4,833,967 A | | 5/1989 | Kornhauser | |
| 4,972,527 A | * | 11/1990 | Wallace | 2/414 |
| 5,319,808 A | * | 6/1994 | Bishop et al. | 2/416 |
| 5,466,505 A | * | 11/1995 | Fukuda et al. | 428/91 |
| 5,565,155 A | | 10/1996 | Cheng-Hung | |
| 6,314,586 B1 | * | 11/2001 | Duguid | 2/411 |
| 6,604,246 B1 | | 8/2003 | Obreja | |
| 6,644,535 B2 | | 11/2003 | Wallach et al. | |
| 6,753,082 B1 | * | 6/2004 | Lobovsky et al. | 428/397 |
| 6,872,439 B2 | * | 3/2005 | Fearing et al. | 428/99 |
| 6,893,733 B2 | * | 5/2005 | Obeshaw | 428/593 |
| 7,208,063 B2 | | 4/2007 | Karmarkar et al. | |
| 7,462,392 B2 | * | 12/2008 | Ranganathan et al. | 428/399 |
| 7,802,320 B2 | * | 9/2010 | Morgan | 2/414 |
| 7,832,023 B2 | * | 11/2010 | Crisco | 2/414 |
| 8,025,971 B2 | * | 9/2011 | Maeno et al. | 428/398 |
| 2007/0068377 A1 | | 3/2007 | Qiao et al. | |
| 2011/0143080 A1 | * | 6/2011 | Ortiz et al. | 428/76 |

FOREIGN PATENT DOCUMENTS

| | | |
|---|---|---|
| EP | 1135663 B1 | 11/1999 |
| WO | WO 00/33013 A2 | 6/2000 |
| WO | WO 2007/034226 A1 | 9/2005 |
| WO | WO 2007/034229 A1 | 9/2005 |
| WO | WO 2007/034230 A1 | 9/2005 |
| WO | WO 2006/068605 A1 | 12/2005 |
| WO | WO 2008/048703 A2 | 3/2007 |
| WO | WO 2010/129109 A1 | 3/2010 |

OTHER PUBLICATIONS

International Search Report and Written Opinion from PCT/US2010/058532, mailed Jul. 6, 2011.
Dean, J., "Effect of thermal and chemical components of bombardier beetle chemical defense: Glossopharyngeal response in two species of toads (*Bufo americanus, B. marinus*)," *J. Comparative Physiology. A*, 135, pp. 51-59 (1980).

(Continued)

*Primary Examiner* — N. Edwards
(74) *Attorney, Agent, or Firm* — Wolf, Greenfield & Sacks, P.C.

(57) ABSTRACT

Protective articles for resisting mechanical loads and associated methods are generally described. The load resistant articles described herein can incorporate one or more features that enhance the ability of the article to absorb an applied force.

22 Claims, 4 Drawing Sheets

OTHER PUBLICATIONS

Dharmasena, K.P. et al., "Mechanical response of metallic honeycomb sandwich panel structures to high-intensity dynamic loading," *Intl. J. Impact Eng.* 35, pp. 1063-1074 (2008).

Eisner, T., "The protective role of the spray mechanism of the bombardier beetle, *Brachynus ballistarius* Lec.," *J. Insect Physiol.* 2, 215-216; IN7-IN7, pp. 217-220, (1958).

Gilchrist, A. et al., "Fast fracture of rubber-toughened thermoplastics used for the shells of motorcycle helmets," *J. Mat. Sci.* 22, pp. 2397-2406 (Jul. 1987).

Goldsmith, W., "Impact," Arnold, London (1960), pp. 38-44.

Hauer, M. et al., "Time resolved study of the laser ablation induced shockwave," *Thin Solid Films* 453-454, pp. 584-588 (2004).

Lai, C., "Potential Applications of the Natural Design of Internal Explosing Chambers in the Bombardier Beetle (*Carabidae, Brachinus*)," Submitted to the Dept. of Materials Science and Engineering in Partial Fulfillment of the Requirements for the Degree of Master of Engineering in Materials Science and Engineering at the Massachusetts Institute of Technology (Sep. 2010).

\* cited by examiner

PROTECTIVE ARTICLES FOR RESISTING MECHANICAL LOADS AND RELATED METHODS

RELATED APPLICATIONS

This application claims the benefit of U.S. Provisional Patent Application No. 61/265,522, filed Dec. 1, 2009, and entitled "Structures for Resisting Mechanical Loads and Related Methods," which is incorporated herein by reference in its entirety for all purposes.

GOVERNMENT SPONSORSHIP

This invention was sponsored by Office of Naval Research Grant No. N00244-09-1-0064. The government has certain rights in the invention.

FIELD OF INVENTION

Protective articles for resisting mechanical loads and related methods are generally described.

BACKGROUND

Articles designed to resist mechanical loads can be useful in protecting objects from damage imparted by applied forces. Such articles can be useful in a wide variety of systems. For example, helmets and pads (e.g., worn by athletes), armor (e.g., worn by soldiers, police officers, or first responders), and the like can be useful in providing protection to otherwise unprotected parts of the body. Load resistant articles can also be used in product packaging to protect goods from mechanical damage. Load resistant articles also can have a variety of industrial uses. Given the wide range of applications for load resistant articles, improved compositions, structures, and methods are desirable.

SUMMARY OF THE INVENTION

The embodiments described herein generally relate to protective articles for resisting mechanical loads and related methods. The subject matter of the present invention involves, in some cases, interrelated products, alternative solutions to a particular problem, and/or a plurality of different uses of one or more systems and/or articles.

In one aspect, a non-naturally occurring protective article for resisting a mechanical load is provided. In some embodiments, the protective article can comprise a curved multi-layer structure comprising a plurality of protrusions extending from at least one surface of the structure, wherein at least a portion of the protrusions have longitudinal axes and are tapered along at least a portion of their longitudinal axes.

The protective article can comprise, in some embodiments, a multi-layer structure that is curved with a first radius of curvature, and comprising a plurality of undulations with radii of curvature smaller than the radius of curvature of the multi-layer structure.

In some embodiments, the protective article can comprise an at least partially enclosed, curved multi-layer structure comprising a kidney shape.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Protective articles for resisting mechanical loads and related methods are generally described. The load resistant articles described herein can incorporate one or more features that enhance the ability of the article to absorb an applied force. In some embodiments, the load resistant articles can include a multi-layered structure. In addition, the load resistant articles can include a plurality of protrusions extending from a surface of the structure. In some embodiments, the protrusions can be tapered along their longitudinal axes. The shape of one or more portions of the structure on or within the article can also aid in diffusing mechanical loads. For example, in some embodiments, a portion of the structure can include curvature on one or more length scales.

As used herein, the phrase "mechanical load" is given its ordinary meaning in the art, and refers to an applied force that is at least partially supported by a body or structure (e.g., the load resisting structure). A mechanical load can be exerted, for example, via pressure, weight, or an interaction with another object. Exemplary sources of mechanical loads include, but are not limited to, explosions (e.g., via debris, shockwave, etc.), collisions (with a stationary object such as the ground or with a moving object such as a bullet, a moving vehicle, a moving person, etc.), static forces (e.g., a force applied upon stacking an object on a load resistant article), pressurized atmospheres, and the like.

Figure 1:
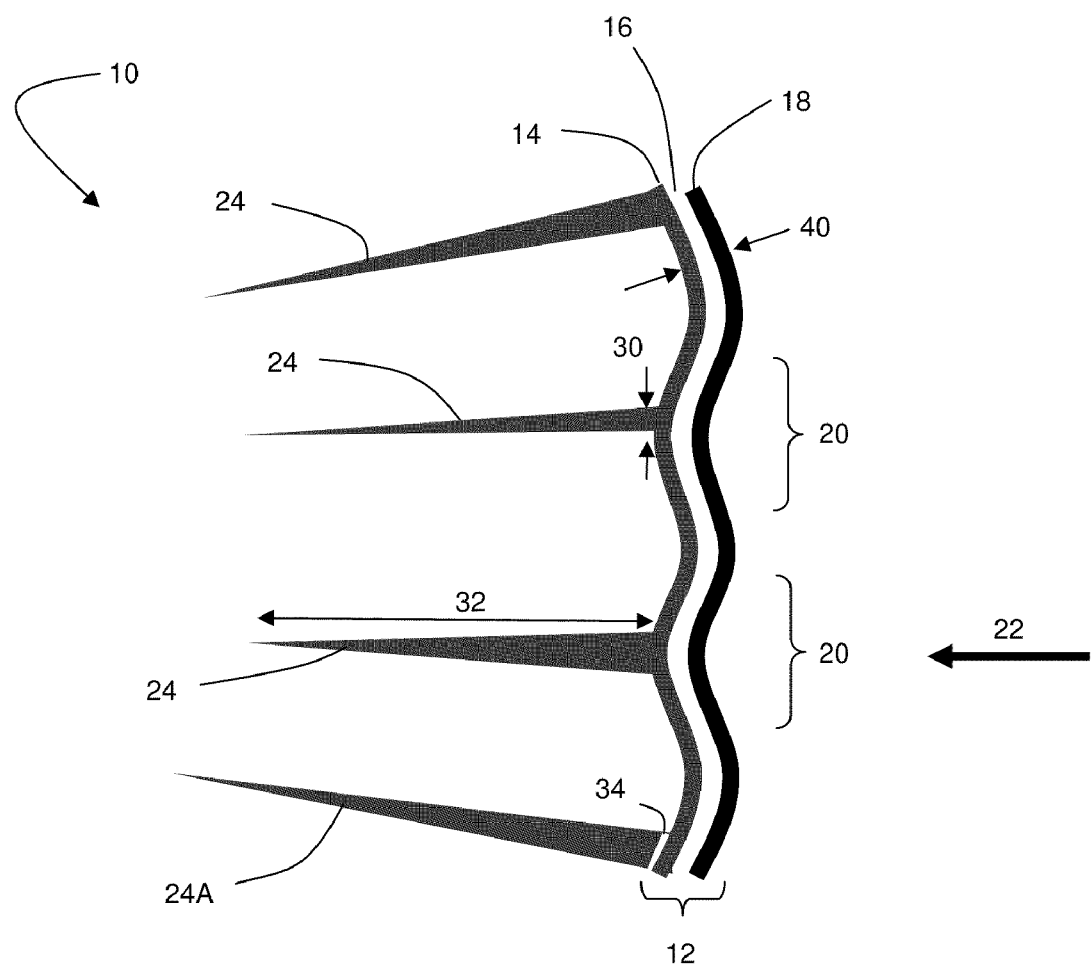
FIG. 1 includes a cross-sectional schematic illustration of a structure for resisting a mechanical load, according to one set of embodiments.

FIG. 1 includes an exemplary cross-sectional schematic illustration of a portion 10 of a protective article for resisting a mechanical load. In this set of embodiments, portion 10 includes a structure 12. Structure 12 can be, for example, in the shape of a shell, and it should be understood that, in every instance in which a structure is described, the structure can be in the shape of a shell.

In some embodiments, the structure can include multiple layers (i.e., the structure can be a multi-layer structure). For example, structure 12 in FIG. 1 includes layers 14, 16, and 18. While the structure in FIG. 1 is illustrated as having three layers, a multi-layer structure can include any suitable number of layers (e.g., at least 2, 4, 5, 10, 50, 100, or more layers). Each of the layers in a multi-layer structure can be made of any suitable material including, for example, a polymer (e.g., Kevlar®, polyethelyne, polypropylene, polyester, and polyamide), a metal (e.g., titanium, aluminum), a ceramic (e.g., alumina, boron carbide), carbon (e.g., carbon fiber composite), or a combination of two or more materials from one or more of these categories. The multi-layer structure can include, in some instances, a foam such as a metallic, ceramic, or polymeric foam. In some embodiments, one or more layers can be formed of a substantially rigid, shape-retaining material (e.g., hard plastics, metals, etc.). In some embodiments, one or more layers can be formed from an elastic material (e.g., vulcanized rubbers, polyurethane rubbers and elastomers, silicone and neoprene rubbers, and the like). For example, in some embodiments, an exterior layer (e.g., a layer designed to be exposed to a mechanical load) can be formed of a rigid material while one or more interior layers can be formed of an elastic material.

In some embodiments, the structure (e.g., a cross-section of the structure) can comprise a plurality of undulations. The undulations can be defined by a change in curvature as a line is traced across the surface of the structure. When the structure is viewed in cross section, the undulations can appear as a series of convex and concave portions which can, in some cases, substantially correspond to a sinusoidal pattern. For example, the cross-sectional schematic in FIG. 1 includes a plurality of undulations 20, which appear as concave regions separated by convex regions, when viewed from the direction of arrow 22. The set of embodiments illustrated in FIG. 1 includes a substantially sinusoidal cross section, although other patterns are possible. In some embodiments, the undulations may be three-dimensional. For example, the undulations in the cross-section may correspond, in some cases, to dimples, as observed when viewing the structure from the direction of arrow 22.

A cross-section of the structure can also comprise, in some cases, large-scale curvature, relative to the length scale of any undulations that may be present within the cross-section. In cases where there are substantially no undulations within the structure, the structure may have a radius of curvature corresponding to the actual curvature of the structure. When undulations are present within the structure, the relatively large-scale curvature of the structure can have a radius of curvature that corresponds to the theoretical radius of curvature of a substantially smooth structure that would be present in the absence of undulations. One of ordinary skill in the art would be capable of determining such a theoretical structure, for example, by drawing an imaginary surface through the inflection points of the undulations. For example, structure 12 in the cross-sectional schematic of FIG. 2 includes a plurality of undulations and a theoretical curve 110 drawn through the inflection points of the undulations. Theoretical curve 110 also includes radius of curvature 112.

Figure 2:
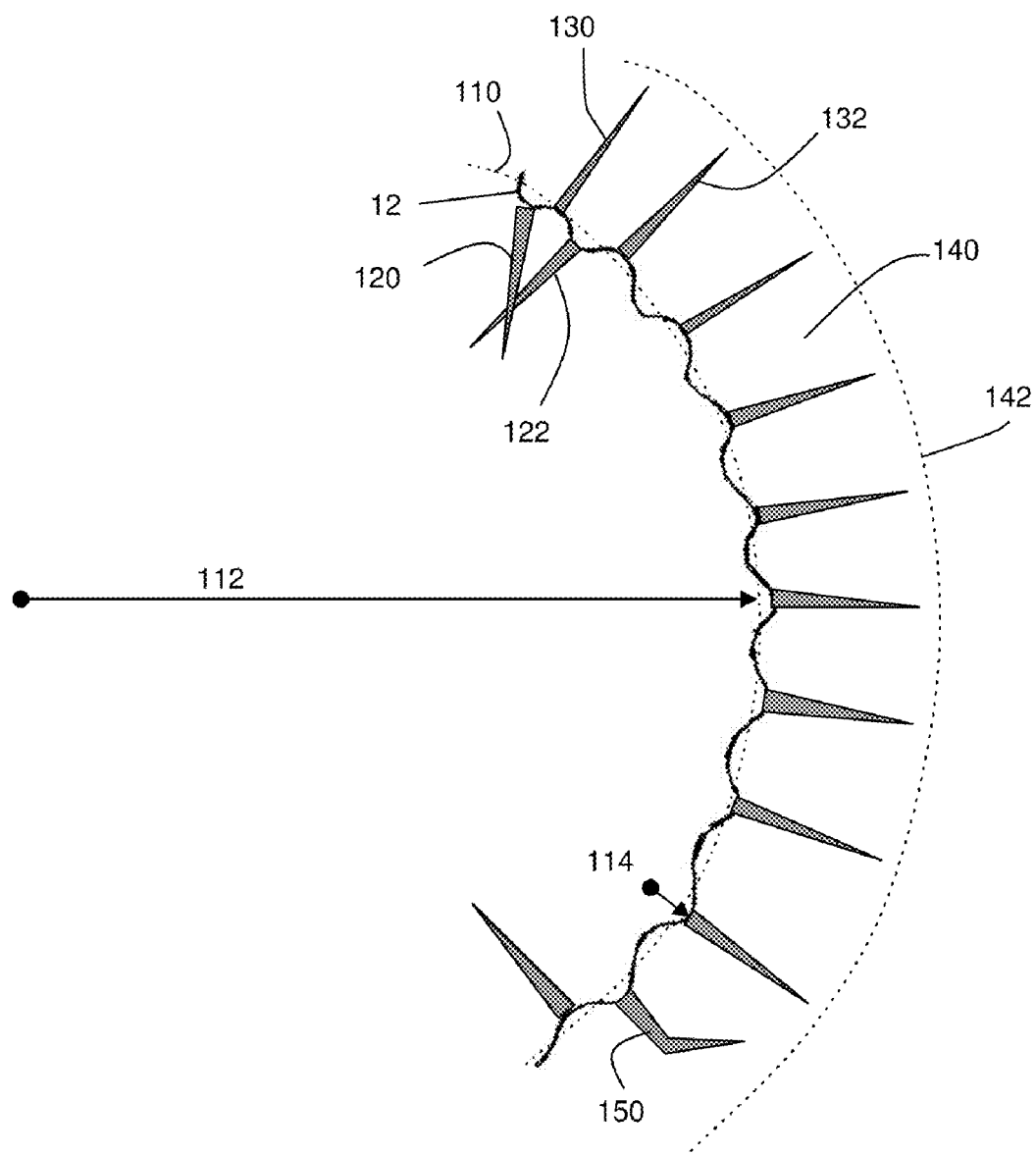
FIG. 2 includes an exemplary cross-sectional schematic illustration, according to one set of embodiments, of a structure for resisting a mechanical load.

In some embodiments, the radius of curvature of the theoretically smooth structure is substantially larger than the average of the radii of curvature of the undulations within the structure. For example, in the set of embodiments illustrated in FIG. 2, the structure 12 includes a theoretically smooth surface 110 with a radius of curvature 112 that is substantially larger than the average of the radii of curvature of the undulations. FIG. 2 includes an exemplary radius of curvature of an undulation, illustrated as 114. In some embodiments, the radius of curvature of the structure is between about 10 times and about 10,000 times, between about 10 times and about 1000 times, between about 10 times and about 500 times, between about 10 times and about 100 times, or between about 10 times and about 50 times longer than the average of the radii of curvature of the plurality of undulations within the structure. The average of the radii of curvature of the plurality of undulations within the structure is calculated as a number average of each of the radii.

In some embodiments, the structure can include a plurality of protrusions extending from a surface of the structure. The protrusions can be in the shape of, for example, fibers, and it should be understood that in every instance in which protrusions are described, the protrusions can comprise fibers.

For example, referring back to the set of embodiments illustrated in FIG. 1, structure 12 includes a plurality of protrusions 24 extending from a surface of layer 14. The protrusions can have any suitable shape and size. For example, the shape of the base of the protrusion can be, in some cases, a circle, an ellipse, a square, a rectangle, a triangle, or any other suitable shape. In some embodiments, the plurality of protrusions can have an average ratio of the length of the longitudinal axis to the thickness at the base of between about 3:1 and about 100:1, between about 3:1 and about 50:1, between about 5:1 and about 50:1, between about 5:1 and about 20:1, or between about 10:1 and about 12:1. As used herein, a "longitudinal axis" spans the geometric center of the cross-section of the base of the protrusion and the geometric center of the cross-section of the tip of the protrusion. One of ordinary skill in the art would understand the term geometric center and how to measure the geometric center of the cross-sections of the base and the tip of a protrusion. In some embodiments, the longitudinal axis of a protrusion may be a substantially straight line (e.g., protrusion 130 in FIG. 2). In some cases, the longitudinal axis of a protrusion may be curved or bent. For example, protrusion 150 in FIG. 2 includes a longitudinal axis that is bent. Generally, the thickness of a protrusion at the base is measured as the maximum cross-sectional dimension of the protrusion at its base, as measured perpendicular to the longitudinal axis of the protrusion. In the set of embodiments illustrated in FIG. 1, dimension 30 corresponds to the width of a protrusion at its base, and dimension 32 corresponds to a length of the longitudinal axis of a protrusion.

In some instances, one or more of the plurality of protrusions can be tapered along its longitudinal axis (e.g., protrusions 24 in FIG. 1). The protrusions can be tapered to any suitable degree. For example, in some embodiments, the protrusions can be tapered such that the tip of the protrusions are substantially pointed. In other cases, a tip of a protrusion may include a substantially smooth, flat surface with a relatively large surface area (e.g., at least about 10%, at least about 20%, at least about 30%, at least about 40%, or more of the cross-sectional surface area at the base of the protrusion).

The protrusions can have any suitable taper angle. Generally, the taper angle of a protrusion refers to the angle formed by the external surfaces of the protrusion within a cross-section of the protrusion taken through its longitudinal axis. In some embodiments, the taper angle of a protrusion may vary depending on the orientation of the cross-section through the longitudinal axis and/or location along the longitudinal axis of the protrusion. In such cases, the protrusion may have a maximum taper angle and a minimum taper angle. In some embodiments, a protrusion (or a plurality of protrusions) can have a taper angle, a maximum taper angle, or a minimum taper angle (or an average of the taper angles, maximum taper angles, and/or minimum taper angles) of between about 3° and about 45°, between about 3° and about 30°, or between about 3° and about 15°. In some embodiments, the difference between the maximum taper angle and the minimum taper angle within a single protrusion (or the average of the differences between the maximum taper angles and the minimum taper angles within each of a plurality of protrusions) can be less than about 15°, less than about 10°, less than about 5°, less than about 3°, less than about 2°, less than about 1°, between about 1° and about 15°, between about 1° and about 10°, between about 1° and about 5°, or between about 1° and about 3°. In some cases, the taper angle within a single protrusion or among a plurality of protrusions is substantially constant.

The protrusions can also be of any suitable size relative to the thickness of the structure from which they extend. For example, in some embodiments, the ratio of the average thicknesses of the bases of the plurality of protrusions to the average thickness of the structure can be between about 0.2:1 and about 5:1, between about 0.25 and about 4:1, between about 0.33 and about 3:1, or between about 0.5:1 and about 2:1. One of ordinary skill in the art would be capable of measuring the average thickness of the structure by averaging a plurality of distributed thickness measurements across the surface of the structure, with the thickness at a point defined as being normal to the tangent of at least one exterior surface of the structure. In FIG. 1, the thickness of structure 12 at one point on the structure is illustrated by dimension 40. In embodiments in which the protrusions are not distributed across the entire structure, any of the ratios mentioned above may be calculated using measurements of the average thickness of the structure along the region of the surface over which protrusions are attached. In some embodiments, the ratio of the average thicknesses of the bases of the plurality of protrusions to the thickness of the structure at the bases of the protrusions can be between about 0.2:1 to about 5:1, between about 0.25 to about 4:1, between about 0.33 to about 3:1, or between about 0.5:1 to about 2:1.

In some cases, the protrusions may occupy a relatively large amount of an external surface of the structure. For example, in some cases, the protrusions may occupy at least about 2%, at least about 5%, at least about 10%, at least about 20%, or at least about 40% of the surface area defined by an external surface of the structure from which the protrusions extend, as measured theoretically in the absence of the protrusions. A surface area can be measured theoretically in the absence of the protrusions by measuring the surface area of an imaginary plane that joins the edges of the protrusion in contact with the structure surface, substantially continues the trajectories of the structure surface at those edges, and establishes a substantially continuous surface. For example, in the set of embodiments illustrated in FIG. 1, the surface area of structure 12, as measured theoretically in the absence of the protrusions, would be measured by establishing imaginary plane 34 at the base of protrusion 24A. In some instances, the plurality of protrusions can occupy between about 2% and about 50%, between about 2% and about 40%, between about 2% and about 30%, or between about 2% and about 20% of the surface area defined by the external surface of the structure from which the protrusions extend, as measured theoretically in the absence of the protrusions.

The protrusions can extend from any of the exterior surfaces of the structure. In some cases, the protrusions can extend from a surface exhibiting relatively large-scale concavity (relative to any undulations on the surface), relatively large-scale convexity, or both. For example, in the set of embodiments illustrated in FIG. 2, protrusions 120 and 122 extend from the surface with relatively large-scale concavity (relative to the undulations), and protrusions 130 and 132 extend from the surface with relatively large-scale convexity. It should be understood that, while only protrusions 120 and 122 are shown extending from the concave surface of the structure in FIG. 2, they may be substantially evenly distributed (e.g., as is shown on the relatively large-scale convex surface in FIG. 2) in some embodiments. In some cases, the exterior surface of the structure that faces the direction from which the mechanical load is designed to be applied (e.g., the exterior surface of a helmet) can include a plurality of protrusions.

In some embodiments, the protrusions may extend from convex portions of the undulations in the structure surface, the convexity of the undulation established as viewed from the side of the structure from which the protrusions extend. Not wishing to be bound by any theory, the convex undulation portions supporting the protrusions may enhance the ability of the protrusions to diffuse a force exerted on the protrusions. Each of the plurality of protrusions illustrated in FIG. 2 are shown as extending from convex portions of the undulations in structure 12.

Figure 3:
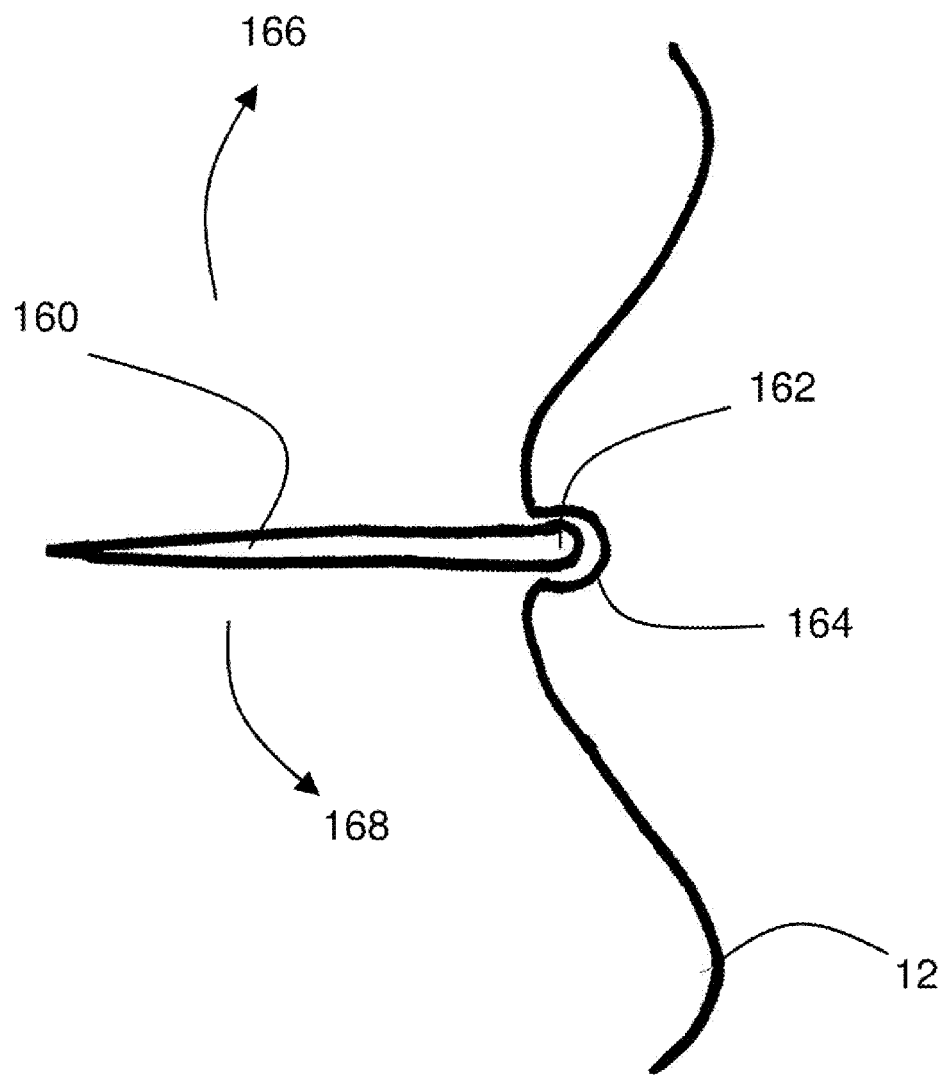
FIG. 3 includes a cross-sectional schematic illustration of a structure comprising a protrusion, according to some embodiments.

One or more protrusions can, in some cases, be constructed and arranged such that the protrusion can be moved (e.g., via rotation). For example, in some cases, the protrusion can be constructed and arranged such that it can be rotated around its base. This can allow one to vary the angle between the protrusion (e.g., the longitudinal axis of the protrusion) and the wall to which it is attached (e.g., upon application of a force). Movement of a protrusion can be achieved, for example, by attaching the protrusion to the structure using a freely rotating connection. Any suitable construction can be employed to achieve movement of a protrusion. For example, in the set of embodiments illustrated in FIG. 3, protrusion 160 includes a rounded end 162 that is positioned within joint 164 of wall 12. Such construction can allow for the protrusion to freely move in the direction of arrows 166 and/or 168, or any other suitable direction. While a ball-joint construction is illustrated in FIG. 3, one of ordinary skill in the art would be capable of incorporating other structures (e.g., a hinge joint) that would allow for movement of one or more protrusions.

A protrusion can, in some cases, be in direct contact with at least one other protrusion. In the set of embodiments illustrated in FIG. 2, protrusions 120 and 122 are in direct contact with each other. Not wishing to be bound by any theory, direct contact between two or more protrusions may serve to further dissipate a mechanical load, relative to the dissipation that would be observed in the absence of direct protrusion contact, but under otherwise essentially identical conditions. In some embodiments, at least about 25%, at least about 50%, at least about 75%, at least about 85%, at least about 95%, or at least about 99% of the protrusions are in direct contact with at least one other protrusion.

In some embodiments, the Young's modulus of the material used to fabricate the structure (e.g., any single layer within a multi-layer structure or the entire multi-layer structure) and/or the material used to fabricate the protrusions can be at least about 0.1 GPa, at least about 1 GPa, at least about 10 GPa, at least about 100 GPa, between about 0.1 GPa and about 1500 GPa, between about 1 GPa and about 1500 GPa, between about 10 GPa and about 1500 GPa, between about 100 GPa and about 1500 GPa, between about 0.1 GPa and about 1500 GPa, between about 1 GPa and about 1500 GPa, between about 10 GPa and about 1500 GPa, between about 100 GPa and about 1500 GPa. In some instances, the ratio of the Young's modulus of the material used to fabricate the structure (e.g., any single layer within a multi-layer structure or an entire multi-layer structure) and the material used to fabricate the protrusions can be at least about 0.001:1, at least about 0.01:1, at least about 0.1:1, at least about 1:1, at least about 10:1, at least about 100:1, at least about 1000:1 and/or less than about 10,000:1, less than about 1000:1, less than about 100:1, less than about 10:1, less than about 1:1, less than about 0.1:1, or less than about 0.01:1.

In some embodiments, the yield strength of the material used to fabricate the structure (e.g., any single layer within a multi-layer structure or the entire multi-layer structure) and/or the material used to fabricate the protrusions can be at least about 1 MPa, at least about 10 MPa, at least about 100 MPa, at least about 1000 MPa, between about 1 MPa and about 5000 MPa, between about 1 MPa and about 2500 MPa, between about 1 MPa and about 1500 MPa, between about 1 MPa and about 500 MPa, between about 1 MPa and about 250 MPa, or between about 1 MPa and about 100 MPa. In some instances, the ratio of the yield strength of the material used to fabricate the structure (e.g., any single layer within a multi-layer structure or an entire multi-layer structure) and the material used to fabricate the protrusions can be at least about 0.001:1, at least about 0.01:1, at least about 0.1:1, at least about 1:1, at least about 10:1, at least about 100:1, at least about 1000:1 and/or less than about 10,000:1, less than about 1000:1, less than about 100:1, less than about 10:1, less than about 1:1, less than about 0.1:1, or less than about 0.01:1.

In some embodiments, the plurality of protrusions can optionally be at least partially surrounded by an encasing material. The encasing material may, in some cases, form a substantially smooth surface over the plurality of protrusions, which may be desirable in forming finished products, in some cases. In some embodiments, the encasing material can cover substantially all of the protrusions. For example, in the set of embodiments illustrated in FIG. 2, encasing material 140 is deposited over the protrusions on the convex surface of structure 12 to form a substantially smooth exterior surface 142. In some embodiments, the external surface of the encasing material may include undulations which may, for example, correspond to the contour of the undulations in the surface of structure 12 and/or to the contour of protrusions extending from the structure. In addition, in some embodiments the encasing material may only partially surround the protrusions such that portions of the protrusions protrude from the exterior surface of the encasing material. In some cases, the encasing material may be formed around the protrusions such that it does not directly contact the protrusions. Such arrangements may allow for the protrusions to move freely upon application of a mechanical force, and can ensure, in some cases, that the protrusions are not crushed upon application of a mechanical force. This can be achieved, in some embodiments, by constructing a scaffold or other support structure around the protrusions, and filling the support structure with an encasing material.

Figure 4A:
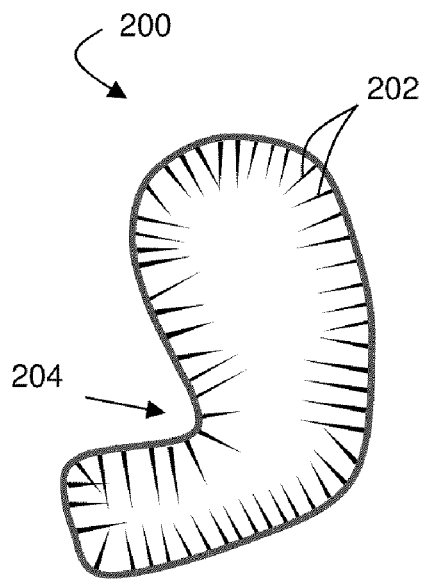
FIGS. 4A-4B include exemplary cross-sectional schematic illustrations of a substantially fully enclosed shell, according to one set of embodiments.
Figure 4B:
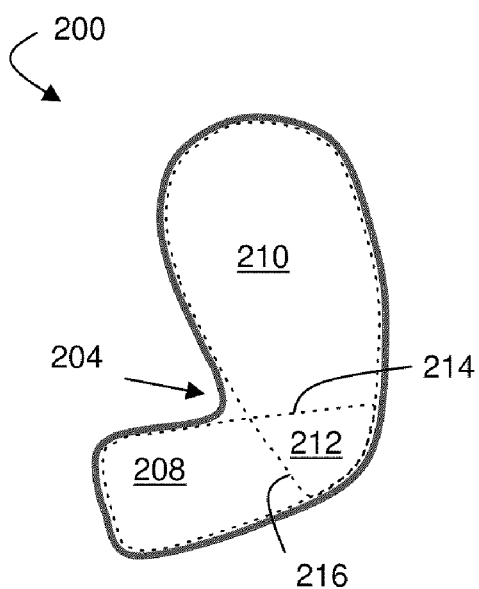

In some embodiments, the structure can be at least partially enclosed. A partially enclosed structure can include, for example, a plurality of ports that connect the interior of the structure to the exterior of the structure. In some embodiments, the structure can be substantially fully enclosed. FIGS. 4A-4B include cross-sectional schematic illustrations of a substantially fully enclosed structure 200, according to one set of embodiments. FIG. 4A includes a cross-section of the structure including protrusions 202 that extend from the interior surface of the structure. It should be understood that the structure may include protrusions extending from the exterior surface of the structure, in place of, or in addition to, protrusions extending from the interior surface of the structure.

The substantially fully enclosed structure can be of any suitable shape. For example, in some cases, the substantially enclosed structure may be in the shape of a kidney (e.g., as illustrated in FIGS. 4A-4B). In some embodiments, the structure can comprise a concave indentation on its exterior surface. For example, the structures in FIGS. 4A-4B include concave indentation 204 in the surface of the structures. In some cases, the length scale of the concave indentation may be relatively large relative to undulations that may be present on the surface of the structure. The concave indentation may, in some embodiments, substantially divide a cross-section of the structure into two areas defined by imaginary lines established by extending the interior surface of the structure along its tangents at the inflection points defining the concave indentation. In some cases, neither of the first and second areas includes a concave portion. The first and second areas can overlap each other, in some embodiments. As an example, the cross-sectional schematic diagram in FIG. 4B includes areas 208 and 210 (each of which include overlap area 212). Area 208 is formed by extending the interior surface of the structure along trajectory 214, while area 210 is formed by extending the interior surface of the structure along trajectory 216. In some embodiments, the lines defining the longest cross-sectional dimensions of each of the two areas are oriented such that the angle between the lines is between about 70° and about 110°, between about 80° and about 100°, or between about 85° and about 95°. In some cases, the size of one of the two areas can be between about 1 time and about 4 times, between about 1.5 times and about 3.5 times, or between about 2 times and about 3 times larger than the second area.

The protective articles described herein (e.g., pads, helmets, armor, etc.) can include, in some cases, a single enclosed structure that is formed in the shape of the protective article. In other embodiments, a component of the protective article may include a plurality of enclosed structures including one or more of the properties described herein. For example, in some embodiments, a protective article may include a bulk material, and a plurality of structures may be distributed within the bulk material.

The articles described herein can be fabricated using any suitable method. In some embodiments, the articles can be fabricated using 3D printing. In some cases, the articles can be fabricated using injection molding (e.g., injection molding of polystyrene, a cyclo-olefin-copolymer, or another thermoplastic).

The load resistant articles described herein can be used in a wide variety of applications. In some embodiments, the load resilient articles can be used as components of articles for the protection of the body (e.g., the human body). For example, in some cases, the articles are part of an athletic pad (e.g., for use in football, hockey, baseball, lacrosse, soccer, skiing, on- or off-road biking, skateboarding, or any other suitable sport in which pads are used). The embodiments described herein can also be used as a component of a helmet (e.g., a motorcycle or bicycle helmet, an athletic helmet, etc.). In some embodiments, the load resistant articles can be used in armor (e.g., bullet-proof vests or other types of body armor). The embodiments described herein may also be used in the protection of industrial equipment from blasts or other impacts, protection of conduit (e.g., power lines) from mechanical impact, or in packaging (e.g., product packaging, shipping packaging, etc.) of goods (e.g., for sale or transport).

Objects that may be protected using an item comprising a protective covering of the present invention include all parts of the human body such as the head, the neck, the shoulders, the arms, the elbow, the wrist, the hands, the chest, the torso, the groin, the legs, the back, the buttocks, the knees, the shins, the ankles and the feet. Objects that may be protected also include industrial articles such as pipes, cables and railings.

Items that may comprise the protective covering include helmets, neck braces, elbow pads, wrist pads, gloves, body armor, shoes, body garments, leg pads, knee pads, shin pads, ankle pads, elbow pads, jackets, shoulder pads, cable covers, pipe covers, railing pads, luggage and storage containers. Any athletic gear and apparel, protective clothing or protective barrier known in the sports and industrial protective covering industry may be protected.

In some instances, the protective systems and articles described herein can be non-naturally occurring. As used herein, a "non-naturally occurring" article refers to an article that is synthesized, treated, fabricated, or otherwise manipulated. That is, the non-naturally occurring article may have a structure (e.g., chemical structure, shape, size, etc.) or may exhibit properties not present in the material or material precursor prior to synthesis, treatment, fabrication, or other manipulation. In some cases, the material may be synthesized, treated, fabricated, and/or otherwise manipulated in a laboratory and/or manufacturing setting. In some cases, a non-naturally occurring article can comprise a naturally-occurring material that is treated, processed, or manipulated to exhibit properties that were not present in the naturally-occurring material, prior to treatment.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-naturally occurring protective article for resisting a mechanical load, comprising:
    a curved multi-layer structure having a plurality of undulations with a first radius of curvature smaller than a radius of curvature of the multi-layer structure and a plurality of protrusions extending from at least one surface of the multi-layer structure, wherein at least a portion of the protrusions have longitudinal axes and are tapered along at least a portion of their longitudinal axes.
2. A protective article as in claim 1, wherein the plurality of protrusions has an average ratio of length of the longitudinal axis to thickness at the base of between about 3:1 and about 100:1.

3. A protective article as in claim 1, wherein the plurality of protrusions has an average ratio of the thickness at the base to the average thickness of the multi-layer structure of between about 0.2:1 and about 5:1.

4. A protective article as in claim 1, wherein the plurality of protrusions occupy between about 2% and about 50% of the surface area defined by an external surface from which the protrusions extend.

5. A protective article as in claim 1, wherein at least about 25% of the protrusions are in direct contact with at least 1 other protrusion.

6. A protective article as in claim 1, wherein a cross-section of the plurality of undulations substantially corresponds to a sinusoidal pattern.

7. A protective article as in claim 1, wherein the radius of curvature of the structure, as measured theoretically in the absence of the undulations, is between about 10 times and about 10,000 times the average of the radii of curvature of the plurality of undulations.

8. A protective article as in claim 1, wherein the plurality of protrusions have a maximum taper angle of between about 3° and about 45°.

9. A protective article as in claim 1, wherein the average of the differences between the maximum taper angles and the minimum taper angles within each of a plurality of protrusions is less than about 15°.

10. A protective article as in claim 1, wherein an encasing material at least partially surrounds the protrusions.

11. A protective article as in claim 1, wherein the structure is at least partially enclosed.

12. A protective article as in claim 1, wherein the structure is substantially fully enclosed.

13. A protective article as in claim 11, wherein the at least partially enclosed structure comprises a concave indentation.

14. A protective article as in claim 1, wherein a cross-section of the structure includes first and second areas defined by imaginary lines established by extending the interior surface of the structure along its tangents at inflection points defining the concave indentation.

15. A protective article as in claim 14, wherein the first and second areas overlap.

16. A protective article as in claim 14, wherein a first line defining the longest cross-sectional dimension of the first area and a second line defining the longest cross-sectional dimension of the second area are oriented such that the angle between the first and second lines is between about 70° and about 110°.

17. A protective article as in claim 14, wherein the first area is between about 1 and about 4 times larger than the second area.

18. A protective article as in claim 1, wherein at least one protrusion extends from a concave surface of the structure.

19. A protective article as in claim 1, wherein at least one protrusion extends from a convex surface of the structure.

20. A protective article as in claim 1, wherein at least one protrusion extends from a convex portion of an undulation in the structure.

21. A protective article as in claim 1, wherein the protective article comprises at least one of a piece of armor, a helmet, a pad, and a package.

22. A protective article as in claim 1, wherein the structure is a shell.

* * * * *